United States Patent
Singhal et al.

(10) Patent No.: US 6,560,568 B1
(45) Date of Patent: May 6, 2003

(54) DERIVING STATISTICAL DEVICE MODELS FROM ELECTRICAL TEST DATA

(75) Inventors: Kumud Singhal, Allentown, PA (US); V. Visvanathan, Allentown, PA (US)

(73) Assignee: Agere Systems, Inc., Allentown, PA (US)

( * ) Notice: Subject to any disclaimer, the term of this patent is extended or adjusted under 35 U.S.C. 154(b) by 0 days.

(21) Appl. No.: 09/290,321

(22) Filed: Apr. 12, 1999

(51) Int. Cl.[7] .............................. G06F 7/60; G06F 17/10; G06F 101/00
(52) U.S. Cl. .............................. 703/2; 703/1; 700/121; 438/14
(58) Field of Search ............................. 703/1–2, 13–22; 700/103–105, 109, 121; 438/14–18

(56) References Cited

U.S. PATENT DOCUMENTS

| | | | | |
|---|---|---|---|---|
| 6,028,994 A | * | 2/2000 | Peng et al. | 703/15 |
| 6,041,270 A | * | 3/2000 | Steffan et al. | 700/121 |
| 6,210,983 B1 | * | 4/2001 | Atchison et al. | 438/14 |
| 6,240,329 B1 | * | 5/2001 | Sun | 700/110 |

OTHER PUBLICATIONS

Lee et al, "An Efficient Statistical Analysis Methodology and Its Application to High–Density DRAMs", IEEE/ACM International Conference on Computer–Aided Design, pp. 678–683 (Nov. 1997).*

Hanson et al. "Analysis of Mixed–Signal Manufacturability with Statistical Technology CAD (TCAD)", Transactions on Semiconductor Manufacturing, vol. 9 No. 4, pp. 478–488 (Nov. 1996).*

Scher et al, "In–Line Statistical Process Control And Feedback For VLSI Integrated Circuit Manufacturing", IEEE Transactions on Components Hybrids, and Manufacturing Technology, vol. 13 Issue 3, pp. 484–489 (Sep. 1990).*

Kumud Singhal V. and Visvanthan, *Statistical Device Models From Worst Files and Electrical Test Data*, IEEE Transactions on Semiconduector Manufacturing, vol. 12, No. 4, Nov. 1999, pp. 470–484.

* cited by examiner

*Primary Examiner*—Samuel Broda
(74) *Attorney, Agent, or Firm*—Duane Morris LLP; Darius C. Gambino, Esq.

(57) ABSTRACT

A production process is used to mass-produce chips, each chip being formed in a substrate of a wafer and having an integrated circuit, each integrated circuit having a plurality of primitive device model types. The integrated circuits are produced using a statistical device model for the production process, which is derived from the sets of e-test data.

22 Claims, 2 Drawing Sheets

200

| | $V_{th}$ | $I_{on}$ | $\beta$ | $V_{th}$ | $I_{on}$ | $\beta$ | $V_{th}$ | $I_{on}$ | $\beta$ | $V_{th}$ | $I_{on}$ | $\beta$ | $V_{th}$ | $I_{on}$ | $\beta$ | $V_{th}$ | $I_{on}$ | $\beta$ |
|---|---|---|---|---|---|---|---|---|---|---|---|---|---|---|---|---|---|---|
| 1 | | | | | | | | | | | | | | | | | | |
| 2 | | | | | | | | | | | | | | | | | | |
| 3 | | | | | | | | | | | | | | | | | | |
| 4 | | | | | | | | | | | | | | | | | | |
| 5 | | | | | | | | | | | | | | | | | | |
| 6 | | | | | | | | | | | | | | | | | | |
| 7 | | | | | | | | | | | | | | | | | | |
| 8 | | | | | | | | | | | | | | | | | | |
| ⋮ | | | | | | | | | | | | | | | | | | |
| 25,000 | | | | | | | | | | | | | | | | | | |

Rows 1–5: CHIP 1; Rows 6–8: CHIP 2

Column groups: NMOS1, NMOS2, NMOS3, PMOS1, PMOS2, PMOS3

300

DERIVING STATISTICAL DEVICE MODELS FROM ELECTRICAL TEST DATA

BACKGROUND OF THE INVENTION

1. Field of the Invention

The present invention relates to techniques for deriving statistical device models for mass-produced products such as semiconductor chips.

2. Description of the Related Art

During the mass manufacture of various products, such as semiconductor chips or systems having integrated circuits (ICs), failures can occur in some of the chips produced, i.e., some of the chips are defective. For example, in mass-producing semiconductor chips, chip-to-chip variations, sometimes referred to as interdie variations, can be introduced during the fabrication process. If these variations are too far from the ideal or nominal for a given chip, the chip may not function properly because various key circuit-level performance metrics may vary too much from the maximum tolerable limits.

The individual units of the product which is mass produced may be sometimes referred to herein as chips. Chips are formed in the substrate of a physical wafer. Typically, several chips are formed in each wafer. A set of wafers that are processed together is called a lot. A wafer is a very thin, flat disc typically about 8–12" in diameter at the present time. The manufacturing process consists of operations on the surface and substrate of the wafer to create a number of chips. Once the wafer is completely processed, it is cut up into the individual chips, which are typically about half inch by half inch in size. A lot is thus a mass-produced set of chips or units, each of which is supposed to conform to an ideal design within certain tolerable limits.

Inevitable variations in the manufacturing process can give rise to interdie variations, which can be more or less severe depending upon the particular manufacturing process as well as upon the particular design of the product to be mass-produced. The number of chips that satisfy all performance specifications from a lot determine the parametric yield of the design and manufacturing process used with a given target foundry for mass producing the chip. Each chip comprises an IC or system which itself comprises a network of several circuit-level elements such as operational amplifiers (op amps) and the like. All of these circuit-level elements are composed of so-called compact or primitive "devices," which are characterized by various compact or primitive model-level parameters. For example, a device may be a transistor or portions thereof, from which larger or more complex structures like op amps are composed. A chip thus comprises a circuit or system which comprises a network of circuit-level elements, which are themselves formed from the compact devices.

The technique of worst-case files is often used in order to model the interdie variations in a manner that is useful for circuit designers. Worst-case files represent a number of cases that include the nominal case and also various extreme cases, each of which consists of device model parameters corresponding to a particular "processing corner." Collectively, the worst-case files represent the nominal and various extremes of device behavior corresponding to the variations of a particular manufacturing process. The use of worst-case files is described in C. Michael & M. Ismail, *Statistical Modeling for Computer-Aided Design of MOS VLSI Circuits*, Kluwer Academic Publishers, Boston/Dordrecht/London, 1992 and in D. Foty, *MOSFET Modeling with Spice*, Prentice Hall, Upper Saddle River, N.J., 1997.

Obviously, a higher parametric yield is desirable so that more working chips are produced in each given lot. Worst-case files are thus used by chip designers to try to achieve high parametric yield. The widths and lengths of the various primitive devices may be adjusted, by repeated simulations and/or experimentation, to achieve a high percentage of chips that are expected that satisfy the worst-case limits. Designs that are predicted to work satisfactorily when simulated with worst-case files can be expected to have high parametric yields. Thus, by adjusting the sizes (widths and lengths) of the various primitive devices and verifying via simulation with the worst-case files that the performance is satisfactory, a high parametric yield can be expected from the resulting design.

Thus, a given circuit is designed and laid out by using worst-case files. The performance of the circuit design may then be simulated for the nominal case, to ensure it satisfies the key performance metrics. The performance for other cases of interdie variation may also be checked to see if all or most of them satisfy the desired key performance metrics. If all or most (to a certain specified percentage) of these cases also perform satisfactorily, then a high parametric yield can be expected since the worst-case interdie variations (variations in important or selected circuit performance metrics) caused by manufacturing variations will still allow the circuit to perform satisfactorily. These and other aspects of using worst-case files are discussed in the Michael & Ismail text and in D. Foty, *MOSFET Modeling with Spice*, Prentice Hall, Upper Saddle River, N.J., 1997.

Such an approach may be feasible for a circuit whose specifications are not very aggressive and whose performance is not very sensitive to interdie variations. Such circuits may be "over-designed" for the nominal case so that circuit performance is still satisfactory even when there is deviation from the nominal case for many or all of the circuit performance metrics. This can result in a circuit design expected to provide satisfactory performance even at all the extreme cases.

However, the worst-case file or "case-based simulation" approach is not always feasible or optimal. For example, in some designs a number of complex, competing performance constraints may be specified. These constraints may be satisfied in the nominal case, but different performance criteria would violate their specifications to different degrees in the extreme cases. In such a situation, the case-based simulation approach does not provide the designer with any quantitative feedback on the robustness of the design. In this case, the designer may be forced to over-design or, if this is not feasible, the parametric yield will be unpredictable and possibly too low or too uncertain for economic viability.

The use of statistical device models (also sometimes known as statistical process models) can help to alleviate this problem. Statistical models of semiconductor devices are used to quantitatively assess the key circuit performance metrics which are expected to result from a mass manufacture in a given production process or foundry. In particular, a statistical device model allows one to predict the correlated variations of the relevant performance metrics of the population of chips to be manufactured via a given process. Thus, with a suitable statistical model it is possible to determine, to some degree of accuracy, the standard deviations and correlations of the various performance metrics of the product or system to be manufactured. The statistical device models can also allow one to more accurately determine the percentage of sample circuits that satisfy all the performance specifications, i.e., to predict the expected parametric yield. Thus, for a given schematic layout and IC design, the statistical model can be used to quantitatively assess the manufacturability of the IC design with respect to a target foundry.

Conventional approaches to statistical device modeling include Michael & Ismail; and P. Chatterjee, P. Yang, D. Hocevar & P. Cox, "Statistical Analysis in VLSI Process/Circuit Design," in *Statistical Approach to VLSI*, ed. S. W. Director & W. Maly, pp. 255–292, North-Holland, 1994. Such approaches typically assume the availability of I-V (current-voltage) measurements on a large number of units. Device model parameters are then extracted for each measured chip using standard parameter extraction techniques. From this database, the correlated distributions of the model parameters are determined and form the basis of further statistical analysis.

These conventional approaches to statistical device modeling, however, may not always be practical or optimal. For instance, in a production environment, statistical device models that capture both nominal and extreme behavior are needed early in the life cycle of a production process. Worst-case files can be generated early, since they are, to a large extent, based on process specifications. However, with conventional techniques it is difficult to produce a good statistical device model early in the life cycle of the process.

A manufacturing process typically shifts through its lifetime, and it may be desirable to update the statistical model at some regular interval. The revised or newer statistical model can be used to predict the parametric yield for further production of the existing IC design, or may be applied to determine the parametric yield for a new IC to be manufactured with similar chip characteristics and by the same or similar process and manufacturing (fabrication) line. Conventional techniques for deriving statistical device models for a mature process are described in J. A. Power; S. C. Kelly, E. C. Griffith, D. Doyle & M. O'Neill, "Statistical Modeling for a 0.6 µm BiCMOS Technology," *Proc. IEEE BCTM*, Minneapolis, Minn., pp. 24–27, September 1997; and D. A. Hanson, R. J. G. Goosens, M. Redford, J. McGinty, J. K. Kibarian & K. W. Michaels, "Analysis of Mixed-Signal Manufacturability with Statistical TCAD," *Proc. IEEE Int'l Symp. Semiconductor Manufacturing*, pp. 271–276, 1995.

Such techniques entail making a new, complete set of I-V measurements on a large number of devices. In this application, the term "I-V measurements" is used to refer to this type of measurement of complete sets of I-V measurements made on a large number of test devices. These I-V measurements are typically made on devices of varying sizes and temperatures on a number of sample wafers, for example. Making I-V measurements entails making a very large number of I-V measurements for each device to be measured. This can, therefore, be a costly, expensive, time-consuming, and often impracticable activity.

From the I-V measurements, device model parameters could be extracted for each test device. Regression analysis is then used to develop equations relating device model parameters to other available data such as electrical test (e-test) data. This allows a statistical device model to be developed that will be able to accurately predict ("play back") the actual e-test data. The use of such tools to develop a statistical model is very complicated and resource- and time-intensive. It requires either foregoing refinements of the statistical model, using cruder models than is otherwise possible to achieve, or making special I-V measurements every time the statistical device model is to be updated. There is, accordingly, a need for improved techniques for deriving or updating statistical device models for mature processes.

SUMMARY

A production process is used to mass-produce chips, each chip being formed in a substrate of a wafer and having an integrated circuit, each integrated circuit having a plurality of primitive device model types. The integrated circuits are produced using a statistical device model for the production process, which is derived from the sets of e-test data.

DESCRIPTION OF THE PREFERRED EMBODIMENT(S)

Figure 1:
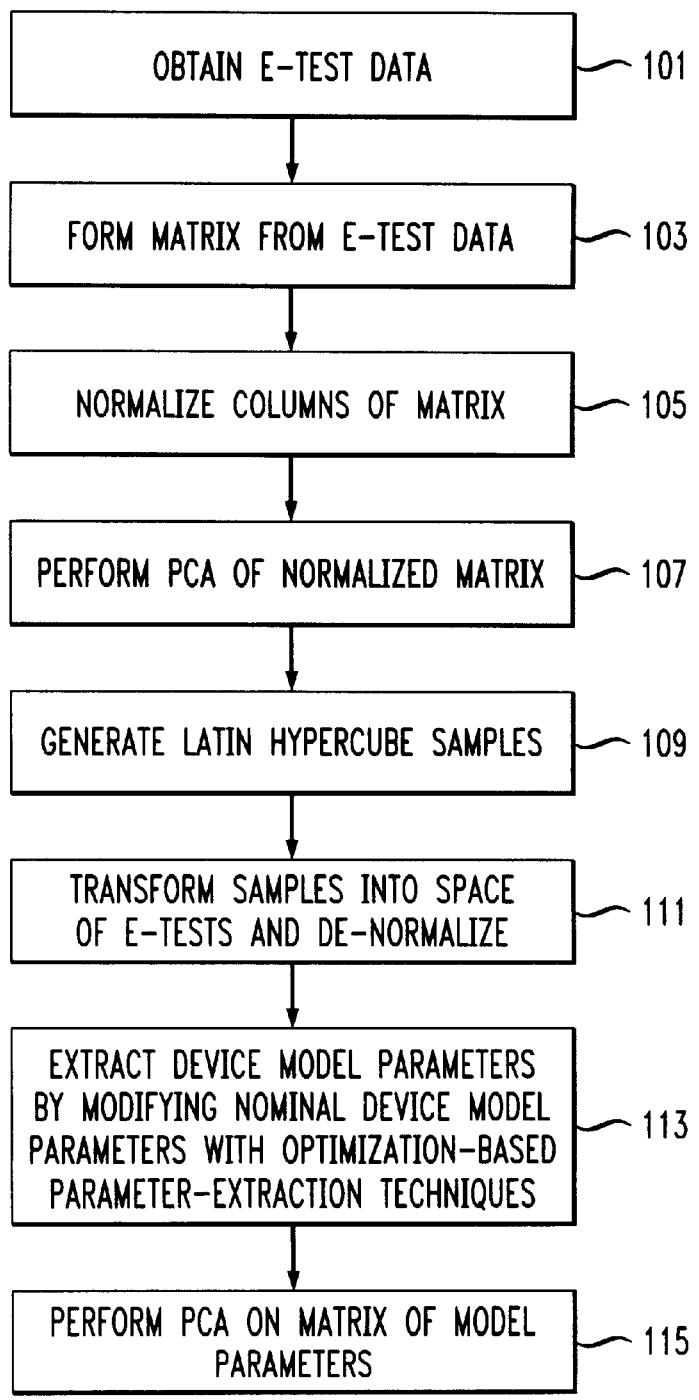
FIG. 1 is a flow chart illustrating a method for deriving a statistical device model from e-test data, in accordance with an embodiment of the present invention.

The present invention provides a technique for developing statistical device models, to be used for circuit simulation, for already-existing manufacturing processes designed to manufacture a given chip. Instead of indirectly determining the statistical distribution of device model parameters by first extracting them from resource- and time-intensive I-V measurements, and then relating these device model parameters to available e-test data, the statistical distributions of the e-test data are used to directly determine the statistical distribution of device model parameters.

In an already existing production semiconductor manufacturing process, the most easily available information on the state of devices is e-test data. E-test data is routinely made from a few representative test spots on each wafer on the manufacturing line, for monitoring purposes. (In this application, the term "e-test data" is used to refer to the result of tests made typically for monitoring purposes on test spots on each wafer of the manufacturing line, over a given period of time or for a given lot or number of lots.) For example, a given wafer may be rejected if the e-test results for that wafer indicate a defective wafer. E-test data, which includes quantities like drain-source saturation region current at a particular bias ($I_{on}$), threshold voltage ($V_{th}$), and maximum gain ($\beta$) of primitive (compact) MOS devices (structures), is routinely collected on a number of sites (e.g., five) on each wafer being processed.

For example, each wafer may contain five sites located at different physical locations around the wafer, where there are six representative primitive structures at each site, where the three key electrical metrics $I_{on}$, $V_{th}$, and $\beta$ are measured at test pads for each structure. For example, there may be three nmos and three pmos structures at each site on each wafer, e.g. the short-wide, long-wide, and long-narrow structures. These may be, for example, 0.35–3 V CMOS technology structures. These test sites are typically located at portions of the wafer outside the chips formed in the wafer.

Chip-to-chip variations exist among all the structures of a chip, and thus similar variations exist from site to site in the measured e-test data. A useful statistical device model will be able to predict the actual variations in e-test data. Thus, since the statistical variation in the e-test data is caused by variations in the primitive devices, it is useful to know the correct statistical distribution to be incorporated into the device model parameters so as to be able to mimic (via computer simulation) the statistical distributions of the e-test data. Thus, once an accurate statistical device model is generated, which can accurately "predict" or "play back" historical (actual) e-test data, it may be used to predict future parametric yields of the same IC design or different IC designs to be manufacutured via the same process.

It is conceivable to utilize I-V measurements to develop a statistical device model. From I-V measurements, device model parameters may be extracted for each test device; regression analysis may then be used to develop equations relating device model parameters to other available data such as e-test data. However, as explained above, the use of such tools to develop a statistical model is very complicated and resource- and time-intensive.

As described in further detail below, the present invention uses the statistical distributions of the e-test data to directly determine the statistical distribution of device model parameters. In order to achieve this in a computationally efficient manner, the technique of principal component analysis (PCA) is utilized in a novel manner. An advantage of the present approach is that, unlike techniques which require making a large number of I-V measurements for test devices on a large number of sample chips or wafers, no other measurements in addition to the e-test measurements need be made from the manufacturing line. For example, I-V measurements may be made for test devices on selected wafers, but not for entire lots of produced wafers because it is impracticable to make a full set of I-V measurements for every single wafer produced.

In the present invention, instead of making I-V measurements and then using e-test data to refine the statistical model derived from the I-V measurements, the already-available e-test data is employed directly to develop the statistical device model, by efficiently extracting the statistical variations in device model parameters from the statistical variation appearing in the e-test data. The statistical device modeling technique of the present invention is therefore cost effective, since e-test measurements are typically already available for monitoring purposes, so that no additional measurements need be done. In addition, although e-test data is not exhaustive in the manner that I-V measurements are, because e-test data is used for monitoring purposes it is already designed to be representative of the behavior of devices on the chip, even though all or even most are not directly measured in e-test measuring. Once a statistical device model that can (in a statistical sense) accurately "play back" the e-test data of a particular process has been developed, it can be used along with circuit simulation techniques to assess the manufacturability of an IC that is targeted to be manufactured on that process line.

In particular, there is a need to develop a statistical device model that can be used to quantitatively assess the key circuit performance metrics, to allow one to predict the correlated variations of the relevant performance metrics of the population of chips to be manufactured via a target process. This allows the standard deviations and correlations of the various performance metrics of the chip and its particular IC design to be determined, and to determine the parametric yield. If the parametric yield is not high enough then the chip may be redesigned, if possible; if not, the low yield may either be tolerated or the chip production may be abandoned or another substituted in its stead. Typical circuit-level performance metrics to be assessed are the slew rate (SR), low-frequency gain (DC gain), gain-bandwidth (GBW), and phase margin (PM) of an op amp; or certain oscillation frequencies of a voltage-controlled oscillator (VCO), such as the frequency of oscillation when the control voltage is at a certain level such as ($V_{DD}$-0.6)V (HIGHF) and the oscillation frequency corresponding to the control voltage being 0.6 V (LOWF). It is useful to be able to determine the mean and standard deviation of such performance metrics, as this can be used to determine parametric yield.

The present invention, therefore, allows statistical device models to be developed directly from e-test data, which is more efficient than developing such models from costly and time-consuming I-V measurements. Referring now to FIG. 1, there is shown a flow chart 100 illustrating a method deriving a statistical device model directly from e-test data, according to a preferred embodiment of the present invention. First, a database of e-test data is obtained (step 101). This is typically a very large database of e-test data collected over several weeks or months, from each of the wafers that has been produced via the given process. The e-test data may be produced by any suitable conventional or other technique, and typically result from the e-tests already performed as a routine monitoring matter on every single chip produced on the distribution line. Various techniques may be used to perform such e-tests, as discussed in S. Lee, C. Choi, J. Kong, W. Lee & J. Yoo, "An Efficient Statistical Analysis Methodology and its Application to High-Density DRAMs," *Proc. IEEE ICCAD*, pp. 678–683, November 1997.

The e-test data collected in step 101, in one embodiment, contains, for each wafer on the manufacturing line, the quantities $I_{on}$, $V_{th}$, and β for six different compact or primitive devices (three nmos structures and three pmos structures) measured at a number of sites on each wafer during manufacture, in order to monitor the electrical characteristics of the chips being manufactured. Thus, if there are five test sites on each wafer, then five sets of data are provided from each wafer, where each set of data ("data item") contains 18 measures, i.e. the three quantities $I_{on}$, $V_{th}$, and β for each of the six different primitive device structures at that site. In the present invention, a statistical device model is developed directly from the e-test data, as described in further detail below.

Figures 2, 3:
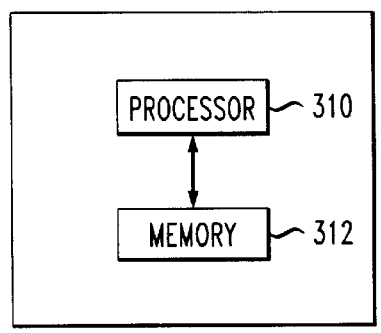
FIG. 2 is a e-test data item matrix for use in deriving the statistical device model of the present invention, in accordance with method of FIG. 1.
FIG. 3 is a block diagram of a computer system for implementing all or part of the method of FIG. 1.

First, an e-test data item matrix is formed whose rows are the various e-test data items, as described below with reference to FIG. 2 (step 103). Each e-test "data item" is a site that contains all six structures. Thus, each e-test data item is associated with 18 key electrical metrics or quantities. Referring now to FIG. 2, there is shown a matrix 200 for use in deriving the statistical device model of the present invention in accordance with method 100 of FIG. 1. The rows of matrix 200 are the data items and the columns of matrix 200 are the electrical measurements ($I_{on}$, $V_{th}$, and β) for the six test devices. Thus, if the total number of e-test data items is n, the size of matrix 200 is nX18. Thus, for example, if only two wafers were produced, each may have five sites and thus five e-test data items. This would yield n=10 rows and 18 columns, for a 10X18 matrix.

More realistically, several hundred or thousand wafers may be produced in a given time period. For example, in a 3-month time period, approximately 5000 wafers may be produced, giving rise to a 25,000X18 size matrix. Matrix 200 therefore is illustrated as containing 18 columns, three columns each for each of the six primitive structures, 3 nmos (nmos1, nmos2, nmos3) and 3 pmos (pmos1, pmos2, and pmos3). The first five data items or rows 1–5 may be produced from five test sites on wafer 1, the next five 6–10 from wafer 2, and so forth. The cells of matrix 200, shown blank in FIG. 2, are filled in with actual e-test values measured on the manufacturing line from each test site of each wafer.

As can be seen, the size of an e-test database can be extremely large. The present invention, therefore, dramatically reduces the volume of data, without losing the information of interest. This is performed in the present invention by a novel application of PCA and latin hypercube sampling. PCA is discussed in Michael & Ismail; and in C. R. Rao, *Linear Statistical Inference and its Applications,* 2d ed. (John Wiley & Sons, 1973). The technique of latin hypercube sampling is described in R. L. Iman, J. C. Helton & J. E. Campbell, "An Approach to Sensitivity Analysis of Computer Models, Part I: Introduction, Input Variable Selection and Preliminary Variable Assessment," *Journal of Quality Technology,* v. 13, no. 3, pp. 174–183, 1981.

First, each column is normalized to have a mean of zero and a variance of 1 (step 105). Next, a PCA of the normalized matrix is performed using singular value decomposition to determine the statistical structure of this data set (step 107). Performing the PCA provides: (1) the standard deviations of the various principal components, and (b) the rotation matrix from the space of principal components to the space of normalized e-tests. Using PCA in this manner, only certain components are retained as "principal" components if they are necessary to explain a specified percentage of the variance in the columns of matrix 200. In one embodiment, the principal components are those necessary to explain 99% of the variance in the columns of matrix 200. In empirical testing, it was found that in some configurations only 14 principal components are necessary to explain more than 99% of the variance in the full body of e-test data.

Next, a certain number (e.g., 100) of latin hypercube samples of the principal components are generated using the standard deviations provided by the PCA (step 109). These latin hypercube samples are then transformed into the space of electrical measurements. This is done by first sampling the principal components (e.g., the 14 significant principal components) using the standard deviations provided by the PCA (note that the means are zero). Next, the samples are transformed using the rotation matrix provided by the PCA and de-normalized into the space of actual electrical measurements (step 111). Empirical testing and simulation has shown that these 100 samples have a correlated distribution substantially identical to that of the much larger original e-test database. I.e., the 100 representative e-test measurement sets are substantially "statistically equal" to the 25,000 sets of e-test measurements. Thus, 100 representative sets of e-test data have at this point been created that accurately reflect the statistical behavior of the much larger e-test data base of 25,000 e-test measurements, thereby achieving a massive data reduction while still retaining most of the statistical information to be used to develop the statistical device model.

Each primitive device model is characterized by a plurality of device model parameters, such as $T_{ox}$ (oxide thickness), and the like. These model parameters may correspond to those of a MOS model such as BSIM3. The next step is therefore to transfer the statistical information of the 100 samples into the space of model parameters, so that a statistical device model is generated that can accurately play back (using, for example, a computer-run simulation program incorporating the BSIM3 model) the 18 electrical measurements associated with each of the 100 representative samples (and thus also with respect to the original set of 25,000 measurements because the smaller set of 100 measurements is statistically equal thereto).

This is done as follows. Starting with the nominal device model, certain critical parameters are modified using standard optimization-based parameter extraction techniques in order to minimize the difference between the playback and target set of e-test values (the playback set is the set output using current model parameters, and the target set is the actual set which the playback set should match when the device model parameters have been optimized) (step 113). This provides 100 sets of model parameter values (a matrix of model parameter sets) whose statistics encapsulate the variations of the original e-test data base stored in matrix 200.

In order to store this statistical information in a compact and convenient way, a PCA of this matrix of model parameter sets is performed (step 115). This may be done similarly to the manner described with respect to steps 105 and 107. This provides a final set of principal components which, along with their standard deviations and the rotation matrix into the space of normalized model parameters, forms the statistical device model which can accurately play back (through model evaluation) the e-test data. Thus, the statistical device model developed herein from the actual e-test data accurately captures, at the device model level, the process variability which is measured at the level of e-tests. It can, therefore, be used in conjunction with a circuit simulator for statistical circuit simulation and parametric yield estimation.

Referring now to FIG. 3, there is shown a computer system 300 for implementing all or part of method 100 of FIG. 1. Computer system 300 comprises processor 310 and memory 312. Processor 310 is preferably a general-purpose programmable microprocessor capable of being programmed to implement all or parts of method 100, as will be appreciated.

The present invention can also be embodied in the form of computer-implemented processes and apparatuses for practicing those processes. The present invention can also be embodied in the form of computer program code embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted as a propagated computer data or other signal over some transmission or propagation medium, such as over electrical wiring or cabling, through fiber optics, or via electromagnetic radiation, or otherwise embodied in a carrier wave, wherein, when the computer program code is loaded into and executed by a computer, the computer becomes an apparatus for practicing the invention. When implemented on a future general-purpose microprocessor sufficient to carry out the present invention, the computer program code segments configure the microprocessor to create specific logic circuits to carry out the desired process.

It will be understood that various changes in the details, materials, and arrangements of the parts which have been described and illustrated above in order to explain the nature of this invention may be made by those skilled in the art without departing from the principle and scope of the invention as recited in the following claims.

What is claimed is:

1. A method for developing a statistical device model for a production process used to mass-produce chips each chip being formed in a substrate of a wafer and having an integrated circuit, each integrated circuit having a plurality of primitive device model types, the method comprising the steps of:

(a) testing each wafer of a plurality during the production process to provide at least one set of e-test data for each said wafer, each wafer having at least one of said chips formed therein during the production process; and (b) deriving the statistical device model from the sets of e-test data, wherein each set of e-test data comprises a plurality of key electrical metrics for each of the plurality of primitive device model types, wherein each set of e-test data is made at a test site on a wafer, the test site comprising representative primitive device models for each of the plurality of primitive device model types, and wherein the plurality of primitive device model types comprises both nmos and pmos short-wide, long-wide, and long-narrow sized CMOS primitive device structures; and the key electrical metrics comprise a drain-source saturation region current metric, a threshold voltage metric, and a maximum gain metric for each of the primitive device types.

2. The method of claim 1, wherein:

each wafer comprises a plurality of the chips and a plurality of test sites; and a corresponding plurality of sets of e-test data is made for each wafer at the plurality of test sites on each wafer.

3. The method of claim 1, comprising the further step of:

(c) using the statistical device model to determine the quantitative yield of a given integrated circuit design to be manufactured with the production process.

4. The method of claim 3, wherein step (c) comprises the steps of:

(1) using the statistical device model to determine the standard deviations and correlations of a plurality of performance metrics of the integrated circuit design; and (2) determining the parametric yield by using the standard deviations and correlations of the plurality of performance metrics to determine the percentage of produced integrated circuits expected to satisfy all of the performance metrics.

5. The method of claim 4, wherein:

the integrated circuit design comprises a plurality of circuit-level elements constructed from one or more of the primitive device model types, the plurality of circuit-level elements comprising an operational amplifier and a voltage-controlled oscillator; and the plurality of performance metrics comprises the slew rate, low-frequency gain, gain-bandwidth, and phase margin of the operational amplifier and the oscillation frequency of the voltage-controlled oscillator at high and low control voltages.

6. A method for developing a statistical device model for a production process used to mass-produce chips, each chip being formed in a substrate of a wafer and having an integrated circuit, each integrated circuit having a plurality of primitive device model types, the method comprising the steps of:

(a) testing each wafer of a plurality of wafers during the production process to provide at least one set of e-test data for each said wafer, each wafer having at least one of said chips formed therein during the production process; and (b) deriving the statistical device model from the sets of e-test data, wherein each set of e-test data is made at a test site on a wafer, the test site comprising representative primitive device models for each of the plurality of primitive device model types, and wherein step (b) comprises the steps of:

(1) forming an e-test data item matrix having a row for each set of e-test data a column for each key electrical metric of the set of e-test data;

(2) normalizing each column of the matrix to have a mean of zero and a variance of 1, wherein each normalized column comprises a normalized key electrical metrics;

(3) performing principal component analysis on the matrix to extract the principal components of the matrix necessary to explain a specified percentage of the variation in the columns of the matrix; and (4) generating a plurality of representative sets of e-test data which are substantially statistically equal to sets of e-test data in the e-test data matrix, wherein the number of representative sets of e-test data is substantially smaller than the number of sets of e-test data in the e-test data item matrix.

7. The method of claim 6, wherein step (b)(4) comprises the steps of:

generating a plurality of latin hypercube samples of the principal components, one for each of the representative sets of e-test data, using the standard deviations provided by the principal component analysis;

transforming the samples into the space of the normalized key electrical metrics using a rotation matrix provided by the principal component analysis; and de-normalizing the transformed samples into the space of the key electrical measurements.

8. The method of claim 6, wherein each of the plurality of primitive device model types is characterized by a plurality of model parameters, the method comprising the further step of:

(c) transforming the statistical information which characterized the plurality of representative sets of e-test data into the space of the model parameters to provide the statistical device model, wherein the statistical information which characterizes the statistical device model encapsulates the statistical information which characterizes the plurality of representative sets of e-test data and the sets of e-test data, whereby the statistical device model can accurately play back the representative sets of e-test data and the sets of e-test data.

9. A computer system for developing a statistical device model for a production process used to mass-produce chips, each chip being formed in a substrate of a wafer and having an integrated circuit, each integrated circuit having a plurality of primitive device model types, the computer system comprising:

(a) an input for receiving a plurality of sets of e-test data, wherein the e-test data is produced by testing each wafer of a plurality of wafers during the production process to provide at least one set of e-test data for each said wafer, each wafer having at least one of said chips formed therein during the production process; and (b) a processor that derives the statistical device model from the sets of e-test data, wherein each set of e-test data comprises a plurality of key electrical metrics for each of the plurality of primitive device model types, wherein each set of e-test data is made at a test site on a wafer, the test site comprising representative primitive device models for each of the plurality of primitive device model types, and wherein the plurality of primitive device model types comprises both nmos and pmos short-wide, long-wide, and long-narrow sized CMOS primitive device structures; and the key electrical metrics comprise a drain-source saturation region current metric, a threshold voltage metric, and a maximum gain metric for each of the primitive device types.

10. The computer system of claim 9, wherein:

each wafer comprises a plurality of the chips and a plurality of test sites; and a corresponding plurality of sets of e-test data is made for each wafer at the plurality of test sites on each wafer.

11. The computer system of claim 9, wherein the processor uses the statistical device model to determine the quantitative yield of a given integrated circuit design to be manufactured with the production process.

12. A computer system for developing a statistical device model for a production process used to mass-produce chips, each chip being formed in a substrate of a wafer and having an integrated circuit, each integrated circuit having a plurality of primitive device model types, the computer system comprising:

(a) an input for receiving a plurality of sets of e-test data, wherein the e-test data is produced by testing each wafer of a plurality of wafers during the production process to provide at least one set of e-test data for each said wafer, each wafer having at least one of said chips formed therein during the production process; and (b) a processor that derives the statistical device model from the sets of e-test data, wherein each set of e-test data comprises a plurality of key electrical metrics for each of the plurality of primitive device model types, wherein the processor:

(1) forms an e-test data item matrix having a row for each set of e-test data a column for each key electrical metric of the set of e-test data;

(2) normalizes each column of the matrix to have a mean of zero and a variance of 1, wherein each normalized column comprises a normalized key electrical metrics;

(3) performs principal component analysis on the matrix to extract the principal components of the matrix necessary to explain a specified percentage of the variation in the columns of the matrix; and (4) generates a plurality of representative sets of e-test data which are substantially statistically equal to sets of e-test data in the e-test data matrix, wherein the number of representative sets of e-test data is substantially smaller than the number of sets of e-test data in the e-test data item matrix.

13. The computer system of claim 12, wherein the processor generates a plurality of representative sets of e-test data by:

generating a plurality of latin hypercube samples of the principal components, one for each of the representative sets of e-test data, using the standard deviations provided by the principal component analysis;

transforming the samples into the space of the normalized key electrical metrics using a rotation matrix provided by the principal component analysis; and de-normalizing the transformed samples into the space of the key electrical measurements.

14. The computer system of claim 12, wherein each of the plurality of primitive device model types is characterized by a plurality of model parameters, wherein the processor transforms the statistical information which characterizes the plurality of representative sets of e-test data into the space of the model parameters to provide the statistical device model, wherein the statistical information which characterizes the statistical device model encapsulates the statistical information which characterizes the plurality of representative sets of e-test data and the sets of e-test data, whereby the statistical device model can accurately play back the representative sets of e-test data and the sets of e-test data.

15. A method for mass-producing an integrated circuit with a production process, the integrated circuit having a plurality of primitive device model types, the method comprising the steps of:

(a) testing each wafer of a plurality of wafers during the production process to provide at least one set of e-test data for each said wafer, each wafer having at least one chip formed in a substrate of the wafer during the production process;

(b) deriving a statistical device model for the production process from the sets of e-test data; and (c) using the statistical device model to determine the quantitative yield of the integrated circuit to be manufactured with the production process, wherein each set of e-test data comprises a plurality of key electrical metrics for each of the plurality of primitive device model types, wherein each set of e-test data is made at a test site on a wafer, the test site comprising representative primitive device models for each of the plurality of primitive device model types, and wherein the plurality of primitive device types comprises both nmos and pmos short-wide, long-wide, and long-narrow sized CMOS primitive device structures; and the key electrical metrics comprise a drain-source saturation region current metric, a threshold voltage metric, and a maximum gain metric for each of the primitive device types.

16. The method of claim 15, wherein:

each wafer comprises a plurality of the chips and a plurality of test sites; and a corresponding plurality of sets of e-test data is made for each wafer at the plurality of test sites on each wafer.

17. The method of claim 15, wherein step (c) comprises the steps of:

(1) using the statistical device model to determine the standard deviations and correlations of a plurality of performance metrics of the integrated circuit; and (2) determining the parametric yield by using the standard deviations and correlations of the plurality of performance metrics to determine the percentage of produced integrated circuits expected to satisfy all of the performance metrics.

18. The method of claim 17, wherein:

the integrated circuit comprises a plurality of circuit-level elements constructed from one or more of the primitive device model types, the plurality of circuit-level elements comprising an operational amplifier and a voltage-controlled oscillator; and the plurality of performance metrics comprises the slew rate, low-frequency gain, gain-bandwidth, and phase margin of the operational amplifier and the oscillation frequency of the voltage-controlled oscillator at high and low control voltages.

19. An integrated circuit made by the method of claim 15.

20. A method for mass-producing an integrated circuit with a production process, the integrated circuit having a plurality of primitive device model types, the method comprising the steps of:
  (a) testing each wafer of a plurality of wafers during the production process to provide at least one set of e-test data for each said wafer, each wafer having at least one chip formed in a substrate of the wafer during the production process;
  (b) deriving a statistical device model for the production process from the sets of e-test data; and
  (c) using the statistical device model to determine the quantitative yield of the integrated circuit to be manufactured with the production process,
    wherein each set of e-test data is made at a test site on a wafer, the test site comprising representative primitive device models for each of the plurality of primitive device model types, and
    wherein step (b) comprises the steps of:
      (1) forming an e-test data item matrix having a row for each set of e-test data a column for each key electrical metric of the set of e-test data;
      (2) normalizing each column of the matrix to have a mean of zero and a variance of 1, wherein each normalized column comprises a normalized key electrical metrics;
      (3) performing principal component analysis on the matrix to extract the principal components of the matrix necessary to explain a specified percentage of the variation in the columns of the matrix; and
      (4) generating a plurality of representative sets of e-test data which are substantially statistically equal to sets of e-test data in the e-test data matrix, wherein the number of representative sets of e-test data is substantially smaller than the number of sets of e-test data in the e-test data item matrix.

21. The method of claim 20, wherein step (b)(4) comprises the steps of:
  generating a plurality of latin hypercube samples of the principal components, one for each of the representative sets of e-test data, using the standard deviations provided by the principal component analysis;
  transforming the samples into the space of the normalized key electrical metrics using a rotation matrix provided by the principal component analysis; and
  de-normalizing the transformed samples into the space of the key electrical measurements.

22. The method of claim 20, wherein each of the plurality of primitive device model types is characterized by a plurality of model parameters, the method comprising the further step of:
  (d) transforming the statistical information which characterizes the plurality of representative sets of e-test data into the space of the model parameters to provide the statistical device model, wherein the statistical information which characterizes the statistical device model encapsulates the statistical information which characterizes the plurality of representative sets of e-test data and the sets of e-test data, whereby the statistical device model can accurately play back the representative sets of e-test data and the sets of e-test data.

* * * * *